United States Patent [19]
Yano et al.

[11] Patent Number: 5,148,387
[45] Date of Patent: Sep. 15, 1992

[54] LOGIC CIRCUIT AND DATA PROCESSING APPARATUS USING THE SAME

[75] Inventors: Kazuo Yano, Hachioji; Koichiro Ishibashi, Tokyo; Tetsuya Nakagawa, Koganei; Katsuhiro Shimohigashi, Musashimurayama; Osamu Minato, Tokyo, all of Japan

[73] Assignee: Hitachi, Ltd., Tokyo, Japan

[21] Appl. No.: 480,674

[22] Filed: Feb. 15, 1990

[30] Foreign Application Priority Data

Feb. 22, 1989 [JP]  Japan .................................. 1-040228

[51] Int. Cl.$^5$ .............................................. G06F 7/50
[52] U.S. Cl. .................................................. 364/784
[58] Field of Search .............................. 364/784–786; 307/464

[56] References Cited

U.S. PATENT DOCUMENTS 4,866,658  9/1989  Mazin et al. ........................ 364/784
4,870,609  9/1989  Yasui et al. ......................... 364/784

FOREIGN PATENT DOCUMENTS 0187698  7/1986  European Pat. Off. ............ 364/784
55-97734  7/1980  Japan .

OTHER PUBLICATIONS

1984 IEEE International Solid-State Circuits Conference Digest of Technical Papers, pp. 16–17.
Chu et al., "A Comparison of CMOS Circuit Techniques: Differential Cascode Voltage Switch Logic Versus Conventional Logic," IEEE Journal of Solid State Circuits, vol. SC-22, No. 4, Aug. 1987, pp. 528–532.
The 279-th General National Convention of the Electronics and Communication Engineers Institute of Japan, pp. 2–83, 1987.
Yano et al., "A 3.8 ns CMOS 16×16 Multiplier Using Complementary Pass Transistor Logic", IEEE 1989 Custom integrated Circuits Conference, pp. 10.4.1–10.4.4.
Shively et al., "Cascading Transmission Gates to Enhance Multiplier Performance", IEEE Trans. on Computers, vol. C-33, No. 7, Jul. 1984, pp. 677–679.

Primary Examiner—Tan V. Mai
Attorney, Agent, or Firm—Antonelli, Terry Stout & Kraus

[57] ABSTRACT

A logic circuit includes first, second, third, fourth, fifth and sixth field effect transistors or FETs, input nodes and an output node. The fifth and sixth FETs are connected to the output node. The first and third FETs are connected to the fifth FET. The second and fourth FETs are connected to the sixth FET. The first and second FETs are connected to the first input node. The third and fourth FETs are connected to the second node. A first signal is supplied to the first input node. A second signal is supplied to gate electrodes of the first and fourth FETs. A signal having a phase opposite to the second signal is supplied to gate electrodes of the second and third FETs. A third signal is supplied to the second input node. One signal selected from the first, second and the third signals is supplied to the gate electrode of the fifth FET. A signal having a phase opposite to the signal supplied to the gate electrode of the fifth FET is supplied to the gate electrode of the sixth FET. An output signal related to the first, second and third input signals is generated from the output node. The output signal is, for example, a carry output signal or alternatively a majority decision logic output signal.

8 Claims, 4 Drawing Sheets

LOGIC CIRCUIT AND DATA PROCESSING APPARATUS USING THE SAME

BACKGROUND OF THE INVENTION

1. Field of the Invention

The present invention relates in general to a logic circuit and more particularly to a logic circuit which is capable of performing logic operations at high speed with low power consumption and which is generally suited for implementation in an integrated circuit. The invention is also concerned with data processing apparatus in which the logic circuit is used.

2. Description of the Prior Art

In view of the trend of speeding up the operation of an integrated circuit for performing arthemetic logic operations in regent years, there arises a demand for high-speed operation of the full adder circuit which is one of the most basic constituent elements of the arithmetic logic circuit.

As an approach suited appropriately for speeding up the operation of the full adder circuit, there has heretofore been proposed a cascade voltage switch logic (hereinafter also referred to as CVSL in abbreviation), as disclosed in Japanese Laid-Open Patent Publication 97734/1980 (JP-A-55-97734) and also discussed by Heller et al in "1984 IEEE International Solid State Circuit Conference", pp. 16-17. A full adder circuit implemented on the basis of the CVSL concept is shown in FIG. 2 of the accompanying drawings. Parenthetically, the full adder circuit shown in FIG. 2 is essentially the same as that proposed by Chu et al in "IEEE Journal of Solid-State Circuits, SC-22", pp. 525-535 (1987). Referring to FIG. 2, the full adder circuit is composed of a logic portion constituted by n-channel MOS transistors M3 to M12 and M15 to M22 and a cross-coupled latching circuit portion constituted by p-channel MOS transistors M1, M2, M13 and M14 and is characterized in that terminals for inverted signals of the input and output signals, respectively, are provided. In the Heller et al's thesis mentioned above, it is reported that the CVSL full adder circuit can operate at a high speed because the electrostatic capacity thereof as viewed from the side of the input terminal is small as compared with that of the conventional CMOS.

As another attempt for speeding up the operation of the full adder circuit, there is known a differential full adder circuit, as discussed, for example, by Kengaku et al in "The 279-th General National Convention Of The Electronics And Communication Engineers Institute of Japan", pp. 2-83 (1987). This circuit is also shown in FIG. 3 of the accompanying drawings. As pointed out by Kengaku et al, this prior art full adder circuit suffers from a problem that the carry output is attended with a delay time which is about twice as long as that of the sum output. In that case, the speed of the full adder circuit is determined by the longer delay time and hence by the carry output.

The prior art cascade voltage switch logic or CVSL circuit can operate only at a speed subtantially the same as that of the conventional full adder constituted by the CMOS, as is mentioned in the thesis of Chu et al's. More specifically, it is reported in the abovementioned thesis that the time taken for the summing operation by the full adder of "Static full CMOS" type is 20 ns, while the time required by the full adder of "Static DCVS" type is 22 ns. (The term "DCVS" used by Chu et al is of the same meaning as the CVSL.) The reason for this will be explained below. Assuming, for example, that input voltages B and C of a full adder are at a high (H) level with an input voltage A being at a low (L) level, let's consider how the sum output S of the full adder changes when the input voltage A changes from the level L to the level H with the input voltages B and C remaining as they are. (Although the following discussion is made in conjunction with the sum output, it should be understood that the same can be said of the carry output $C_o$.) At that time, the sum output S changes from the level L to the level H while the inverted output SN of the sum output S changes from the level H to the level L. Starting from this state, when the input voltage A changes from the level L to the level H, the MOS transistor M3 assumes the conductive state, whereby charge accumulated at a node N1 is discharged through a path constituted by the MOS transistor M3, M7 and M11. At that time point, since a node N2 is at the low level L, the p-channel MOS transistor M1 is in the conductive state. When the absolute value of the amount of current which the n-channel MOS transistors M3, M7 and M11 can conduct is represented by $I_n$ with that of the p-channel MOS transistor M1 being represented by $I_p$, the current contributing to the discharge at the node N1 is given by $I_n - I_p$. Accordingly, it is necessary to design the circuit so that the difference of $(I_n - I_p)$ is at least positive. In practice, the circuit design is made such that the difference $(I_n - I_p)$ is substantially equal to a half of $I_n$ with a view to attaining the high-speed operation. To say in another way, the circuit is so designed that $I_n \approx 2I_p$. Consequently, the current drivability of the node N1 upon discharge thereof is about a half of that of the conventional CMOS. In the succeeding operation, the potential at the node N1 changes from the level H to the level L, whereupon the p-channel MOS transistor M2 becomes conductive to allow the node N2 to be charged through the MOS transistor M2, as the result of which the potential at the node N2 changes from the level L to the level H. At that time, the current amount which can flow through the p-channel MOS transistor M2 is $I_p$ or $I_n/2$. Accordingly, the corresponding current drivability is about a half that of the CMOS at this time as well. As will now be appreciated, it is required to design the circuit such that the current drivability is reduced by a half for both the charging and discharging in order to assure the normal operation of CVSL, which in turn means that the effect of the reduction in the input capacity is substantially canceled out, thus giving rise to a problem. It is further noted that the p-channel MOS transistors are used in the CVSL for charging the output nodes N1 and N2. Consequently, the speed of operation upon charging is lowered when compared with the operation speed upon discharging. The operation speed at the time of charging can be improved by increasing the design gate width of the p-channel MOS transistor. In that case, however, an equivalently large capacity is connected to the output node, which results in that the operation speed at the time of discharge is lowered.

In FIGS. 2 and 3, reference symbols AN, BN, CN and $CN_o$ designate the inverted signals, respectively, of the input signal A to be added, the input signal B to be added, the carry input signal C and the carry output signal $C_o$.

In conjunction with the full adder circuit proposed by Kengaku et al and shown in FIG. 3 of the accompanying drawings, there exists a problem that the carry output is accompanied with a larger delay when compared with the sum output, which can be explained by the fact that the signal transmission path intervening between the input and the carry output is constituted by three stages of logic circuits, while the signal transmission path for the sum output is constituted by two stages of logic circuits. It is again assumed, by way of example, that the input voltage B is at the low level L with the input voltage C being at the high level H and that the voltage A changes from the level L to the level H. In this state, in the critical path extending from the input to the carry output, the n-channel MOS transistor M23 is supplied with the signal A to allow the node N3 to be charged, whereon the potential at the node N3 is supplied to the n-channel MOS transistor M39 to allow the node N4 to be charged, which is then followed by the discharge of the output node $C_o$ through the output n-channel MOS transistor M46. The three operations mentioned above take place successively. In contrast, in the case of the critical path extending from the input to the sum signal output, the signal A inputted to the n-channel MOS transistor M26 causes the node N5 to be discharged through the n-channel MOS transistors M26 and M31, whereon the sum output p-channel MOS transistor 33 operates to allow the output node SN to be charged. In other words, the operation in this path is carried out through two stages.

SUMMARY OF THE INVENTION

It is therefore an object of the present invention to provide a logic circuit which is capable of operating at a high speed and which can ensure a sufficient current drivability of the transistors with a reduced number of circuit stages required in the path extending from the input to the output.

Another object of the present invention is to provide data processing apparatus in which the logic circuit mentioned above is employed.

In view of the above objects, there is provided according to an aspect of the present invention a logic circuit which comprises first to sixth switching elements (M71, M72, M73, M74, M79, M80) such as, for example, field effect transistors or bipolar transistors, each of which includes a first electrode (e.g. drain or collector electrode), a second electrode (e.g. source or emitter electrode) and a control input electrode (e.g. gate or base electrode) and in each of which electrical conduction and non-conduction between the aforementioned first electrode and second electrode are controlled in dependence on the signal levels supplied to the aforementioned control input electrode, the logic circuit further comprising first to fifth nodes (N6, . . . , N10), wherein a current path between the first electrode and the second electrode of the aforementioned first switching element (M71) is connected between the aforementioned first node (N6) and the aforementioned third node (N8), a current path between the first electrode and the second electrode of the aforementioned second switching element (M72) is connected between the first node (N6) and the fourth node (N9) mentioned above, a current path between the first electrode and the second electrode of the aforementioned third switching element (M73) is connected between the second node (N7) and the third node (N8) mentioned above, a current path between the first electrode and the second electrode of the aforementioned fourth switching element (M74) is connected between the second node (N7) and the fourth node (N9) mentioned above, a current path between the first electrode and the second electrode of the aforementioned fifth switching element (M79) is connected between the third node (N6) and the fifth node (N10) mentioned above, a current path between the first electrode and the second electrode of the aforementioned sixth switching element (M80) is connected between the fourth node (N9) and the fifth node (N10) mentioned above, a first input signal (A) is supplied to the aforementioned first node (N6), a second input signal (B) is supplied to the control input electrode of the aforementioned first switching element (M71) and the control input electrode of the aforementioned fourth switching element (M74), a signal (BN) having a phase opposite to that of the second input signal (B) mentioned above is supplied to the control input electrode of the aforementioned second switching element (M72) and the control input electrode of the aforementioned third switching element (M73), a third input signal (C) is supplied to the aforementioned second node (N7), one signal (e.g. A) selected from the first, second and third input signals (A, B, C) mentioned above is supplied to the control input electrode of the aforementioned fifth switching element (M79), and a signal having a phase opposite to that of the signal supplied to the control input electrode of aforementioned fifth switching element (M79) is supplied to the control input electrode of the aforementioned sixth switching element (M80).

With the circuit structure described above, there can be generated from the aforementioned fifth node (N10) an output signal related to the first, second and third input signals (A, B, C), which may be, for example, a carry output signal or a majority decision logic output signal related to the first, second and third input signals (A, B, C).

In the logic circuit according to the present invention, the cross-coupled latching circuit constituted by the p-channel field effect transistors and providing an obstacle to the realization of high-speed operation in the hitherto known circuits shown in FIGS. 2 and 3 is rendered unnecessary. Further, the number of the circuit stages required in the path intervening between the input and the output can significantly be reduced, whereby the logic circuits implemented by using the field effect transistors or PETs can remarkably be simplified. This means in turn that speeding-up of the arithmetic logic operation can be realized.

DESCRIPTION OF THE PREFERRED EMBODIMENTS

Exemplary Embodiment 1

Now, a first exemplary embodiment of the present invention will be described by reference to FIG. 1, which is a circuit diagram showing a full adder circuit in which a carry signal generation is adopted according to the first embodiment of the present invention. Input signals A and B to be added, a carry input C and respective inverted signals AN, BN and CN thereof are supplied to the full adder circuit as the input signals, whereby a sum signal S, a carry output signal $C_o$ and respective inverted signals SN and $CN_o$ thereof are outputted from the full adder circuit.

The full adder circuit according to the instant embodiment is composed of a sum and inverted sum output signal generating circuitry constituted by MOS transistors M59 to M70 and a carry and inverted carry output signal generating circuitries constituted by MOS transistors M71 to M86. Of these MOS transistors, those denoted by M67, M68, M83 and M85 are p-channel MOS transistors, while the others are n-channel MOS transistors.

Figure 1:
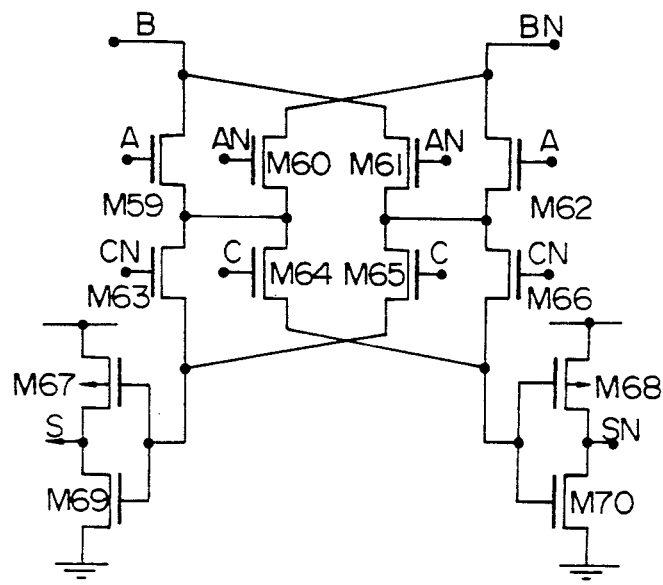
FIG. 1 is a circuit diagram showing a full adder circuit according to a first exemplary embodiment of the present invention.
Figure 1:
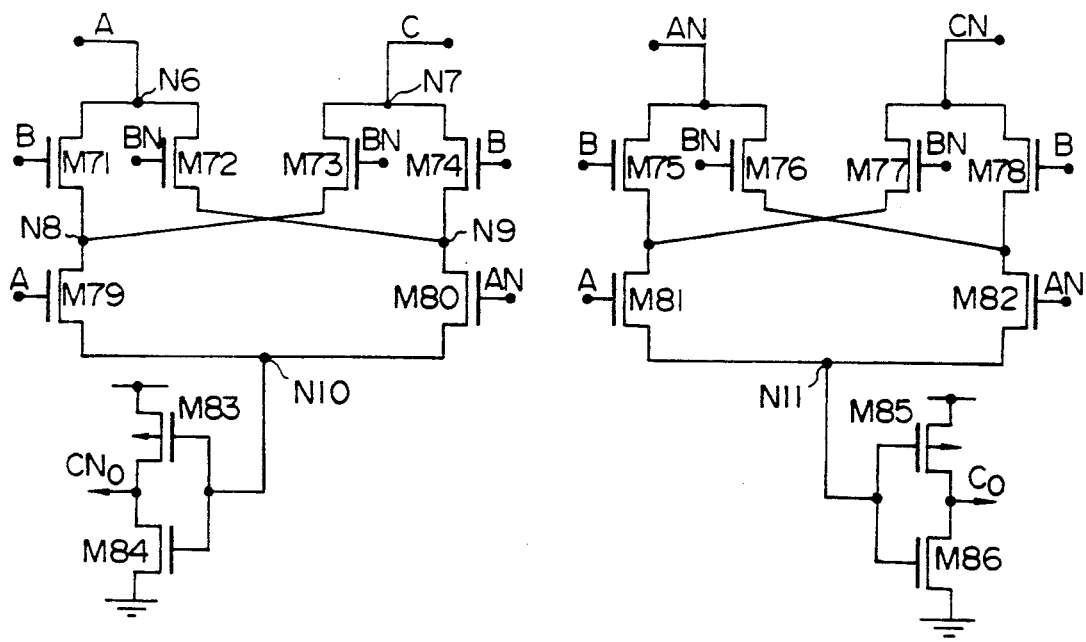

An important aspect of the full adder circuit according to the first embodiment of the invention shown in FIG. 1 is seen in the carry output signal generating circuitry which is characterized by the circuit arrangements or configurations set forth below.

More specifically, the inverted carry output signal generating circuitry shown in FIG. 1 at a lower left portion thereof comprises first to sixth switching elements (MOS transistors M71, M72, M73, M74, M79, M80) which may be, for example, field effect transistors or bipolar transistors, each of which elements includes a first electrode (e.g. drain or collector electrode), a second electrode (e.g. source or emitter electrode) and a control input electrode (e.g. gate or base electrode) and in each of which elements electrical conduction and non-conduction between the first electrode and the second electrode are controlled in dependence on the signal levels supplied to the control input electrode, and first to fifth nodes (N6, ..., N10), wherein a current path between the first electrode and the second electrode of the first switching element (MOS transistor M71) is connected between the first node (N6) and the third node (N8), a current path between the first electrode and the second electrode of the second switching element (MOS transistor M72) is connected between the first node (N6) and the fourth node (N9), a current path between the first electrode and the second electrode of the third switching element (MOS transistor M73) is connected between the second node (N7) and the third node (N8), a current path between the first electrode and the second electrode of the fourth switching element (MOS transistor M74) is connected between the second node (N7) and the fourth node (N9), a current path between the first electrode and the second electrode of the fifth switching element (MOS transistor M79) is connected between the third node (N6) and the fifth node (N10), a current path between the first electrode and the second electrode of the sixth switching element (MOS transistor M80) is connected between the fourth node (N9) and the fifth node (N10), a first input signal (A) is supplied to the first node (N6), a second input signal (B) is supplied to the control input electrode of the first switching element (MOS transistor M71) and to the control input electrode of the fourth switching element (MOS transistor M74), a signal (BN) having a phase opposite to that of the second input signal (B) is supplied to the control input electrode of the second switching element (MOS transistor M72) and to the control input electrode of the third switching element (MOS transistor M73), a third input signal (C) is supplied to the second node (N7), one signal (e.g. A) selected from the first, second and third input signals (A, B, C) is supplied to the control input electrode of the fifth switching element (MOS transistor M79), and wherein a signal having a phase opposite to that of the signal supplied to the control input electrode of the fifth switching element (MOS transistor M79) is supplied to the control input electrode of the sixth switching element (MOS transistor M80).

With the circuit structure described above, there can be generated from the fifth node (N10) an output signal related to the first, second and third input signals (A, B, C), which may be, for example, a carry output signal or a majority decision logic output signal related to the first, second and third input signals (A, B, C).

Constructed in a substantially similar manner to the inverted carry signal generating circuit is a non-inverting carry output signal generating circuit which is shown in FIG. 1 at a lower right portion.

Next, logical operation of the full adder circuit in general will be explained. The full adder performs logical operations which involve three inputs and two outputs as indicated below.

|               | INPUTS | | | OUTPUTS | |
| ------------- | --- | --- | --- | --- | --- |
|               | A | B | C | S | $C_o$ |
| Operation (1) | 0 | 0 | 0 | 0 | 0 |
| Operation (2) | 1 | 0 | 0 | 1 | 0 |
| Operation (3) | 0 | 1 | 0 | 1 | 0 |
| Operation (4) | 1 | 1 | 0 | 0 | 1 |
| Operation (5) | 0 | 0 | 1 | 1 | 0 |
| Operation (6) | 1 | 0 | 1 | 0 | 1 |
| Operation (7) | 0 | 1 | 1 | 0 | 1 |
| Operation (8) | 1 | 1 | 1 | 1 | 1 |

Now, the operations (1) to (8) will be explained below in detail.

Operation (1)

The MOS transistors M60 and M63 are turned on (i.e. in the conductive state), and the inverted signal BN of a high level is supplied to the gates of the CMOS inverters M67 and M69, respectively, whereby the sum output S assumes a low level. At this time, the MOS transistors M64 and M65 are turned off (in the non-conductive state), and the signal B of low level is supplied to the gates of the MOS transistors M68 and M70, respectively, as the result of which the inverted sum signal SN assumes the high level. At this time point, the MOS transistors M62 and M65 are also turned off.

The MOS transistors M72 and M80 are turned on, and the signal A of the low level is supplied to the gates of the CMOS inverters M83 and M84, respectively. Thus, the inverted carry output signal $CN_o$ assumes the high level. At this time, the MOS transistors M71, M74 and M79 are off and exert no influence to the node N10.

Further, the MOS transistors M76 and M82 are turned on, and the inverted signal AN of the high level is supplied to the gates of the CMOS inverters M85 and M86, respectively, as the result of which the carry output $C_o$ assumes the low level. At this time, the MOS transistors M75, M78 and M81 are off and exert no influence to the node N11.

Operation (2)

The MOS transistors M59 and M63 are turned on, and the signal B of the low level is supplied to the gates of the CMOS inverters M67 and M69, respectively, whereby the level of the sum output S becomes high. On the other hand, the MOS transistors M60 and M64 are turned off at this time. Further, the MOS transistors M62 and M66 are turned on, whereby the inverted signal BN of the high level is supplied to the gates of the CMOS inverters M68 and M70, which results in that the inverted sum output SN assumes the low level. At that time point, the MOS transistors M61 and M65 are turned off.

The MOS transistors M73 and M79 are turned on, whereby the signal C of the low level is supplied to the gates of the CMOS inverters M83 and M84, respectively, which results in that the inverted carry output $CN_o$ assumes the high level. At that time, the MOS transistors M71, M74 and M80 are off and exert no influence to the node N10.

Further, the MOS transistors M77 and M81 are turned on, whereby the inverted signal CN of the high level is supplied to the gates of the CMOS inverters M85 and M86, respectively, which results in that the carry output $C_o$ assumes the low level. Consequently, the MOS transistors M75, M78 and M82 are off, exerting no influence to the node N11.

Operation (3)

The MOS transistors M60 and M63 are turned on, and the signal BN of the low level is supplied to the gates of the CMOS inverters M67 and M69, respectively, whereby the sum output S assumes the high level. On the other hand, the MOS transistors M69 and M64 are turned off at that time point. Further, the MOS transistors M61 and M66 are turned on, whereby the signal B of the high level is supplied to the gates of the CMOS inverters M68 and M70, respectively, as the result of which the inverted sum output SN assumes the low level. At that time point, the MOS transistors M62 and M65 are turned off.

The MOS transistors M74 and M80 are turned on, whereby the signal C of the low level is supplied to the gates of the CMOS inverters M83 and M84, respectively, which results in that the inverted carry output $CN_o$ assumes the high level. At that time, the MOS transistors M72, M73 and M79 are off and exert no influence to the node N10.

Further, the MOS transistors M78 and M82 are turned on, whereby the inverted signal CN of the high level is supplied to the gates of the CMOS inverters M85 and M86, respectively, which results in that the carry output $C_o$ assumes the low level. At this time point, the MOS transistors M76, M77 and M81 are off and thus exert no influence to the node N11.

Operation (4)

The MOS transistors M59 and M63 are turned on, and the inverted signal BN of the high level is supplied to the gates of the CMOS inverters M67 and M69, respectively, whereby the sum output S assumes the low level. On the other hand, the MOS transistors M60 and M64 are turned off at this time point. Further, the MOS transistors M62 and M66 are turned on, whereby the inverted signal BN of the low level is supplied to the gates of the CMOS inverters M68 and M70, respectively, resulting in that the inverted sum output SN assumes the high level. At this time point, the MOS transistors M61 and M65 are turned off.

The MOS transistors M71 and M79 are turned on, whereby the signal A of the high level is supplied to the gates of the CMOS inverters M83 and M84, respectively, as the result of which the inverted carry output $CN_o$ assumes the low level. At that time, the MOS transistors M72, M73 and M80 are off and exert no influence to the node N10.

Further, the MOS transistors M75 and M81 are turned on, whereby the inverted signal AN of the low level is supplied to the gates of the CMOS inverters M85 and M86, respectively, which results in that the carry output $C_o$ assumes the high level. At this time point, the MOS transistors M76, M77 and M82 are off, exerting no influence to the node N11.

Operation (5)

The MOS transistors M61 and M65 are turned on, and the signal B of the low level is supplied to the gates of the CMOS inverters M67 and M69, respectively, whereby the sum output S assumes the high level. On the other hand, the MOS transistors M62 and M66 are turned off at this time. Further, the MOS transistors M60 and M64 are turned on, whereby the inverted signal BN of the high level is supplied to the gates of the CMOS inverters M68 and M70, respectively, which results in that the inverted sum output SN assumes the low level. At this time point, the MOS transistors M59 and M63 are turned off.

The MOS transistors M72 and M80 are turned on, whereby the signal A of the low level is supplied to the gates of the CMOS inverters M83 and M84, respectively, which results in that the inverted carry output $CN_o$ assumes the high level. At that time, the MOS transistors M71, M74 and M79 are off and exert no influence to the node N10.

Further, the MOS transistors M76 and M82 are turned on, whereby the inverted signal AN of the high level is supplied to the gates of the CMOS inverters M85 and M86, respectively, which results in that the carry output $C_o$ assumes the low level. At this time point, the MOS transistors M75, M78 and M81 are off, and exert no influence to the node N11.

Operation (6)

The MOS transistors M62 and M65 are turned on, and the inverted signal BN of the high level is supplied to the gates of the CMOS inverters M67 and M69, respectively, whereby the sum output S assumes the low level. On the other hand, the MOS transistors M61 and M66 are turned off at this time point. Further, the MOS transistors M59 and M64 are turned on, whereby the signal B of the low level is supplied to the gates of the CMOS inverters M68 and M70, respectively, resulting in that the inverted sum output SN assumes the high level. At this time point, the MOS transistors M60 and M63 are turned off.

The MOS transistors M73 and M79 are turned on, whereby the signal C of the high level is supplied to the gates of the CMOS inverters M83 and M84, respectively, which results in that the inverted carry output $CN_o$ assumes the low level. At this time, the MOS transistors M71, M74 and M80 are off and exert no influence to the node N10.

Further, the MOS transistors M77 and M81 are turned on, whereby the inverted signal CN of the low level is supplied to the gates of the CMOS inverters M85 and M86, respectively, which results in that the carry output $C_o$ assumes the high level. At this time point, the MOS transistors M75, M78 and M82 are off, and exert no influence to the node N11.

Operation (7)

The MOS transistors M61 and M65 are turned on, and the signal B of the high level is supplied to the gates of the CMOS inverters M67 and M69, respectively, whereby the sum output S assumes the low level. On the other hand, the MOS transistors M62 and M66 are turned off at this time point. Further, the MOS transistors M60 and M64 are turned on. Thus, the inverted signal BN of the low level is supplied to the gates of the CMOS inverters M68 and M70, respectively, resulting in that the inverted sum output SN assumes the high level. At this time point, the MOS transistors M59 and M63 are turned off.

The MOS transistors M74 and M80 are turned on, whereby the signal C of the high level is supplied to the gates of the CMOS inverters M83 and M84, respectively, which results in that the inverted carry output $CN_o$ assumes the low level. At that time, the MOS transistors M72, M73 and M79 are off and exert no influence to the node N10.

Further, the MOS transistors M78 and M82 are turned on, whereby the inverted signal CN of the low level is supplied to the gates of the CMOS inverters M85 and M86, respectively, which results in that the carry output $C_o$ assumes the high level. At this time point, the MOS transistors M76, M77 and M81 are off and exert no influence to the node N11.

Operation (8)

The MOS transistors M62 and M65 are turned on, and the inverted signal BN of the low level is supplied to the gates of the CMOS inverters M67 and M69, respectively, whereby the sum output S assumes the high level. On the other hand, the MOS transistors M61 and M66 are turned off at this time point. Further, the MOS transistors M59 and M64 are turned on, whereby the signal B of the high level is supplied to the gates of the CMOS inverters M68 and M70, respectively, resulting in that the inverted sum output SN assumes the low level. At that time point, the MOS transistors M60 and M63 are turned off.

The MOS transistors M71 and M79 are turned on, whereby the signal A of the high level is supplied to the gates of the CMOS inverters M83 and M84, respectively, which results in that the inverted carry output $CN_o$ assumes the low level. At that time, the MOS transistors M72, M73 and M80 are off and exert no influence to the node N10.

Further, the MOS transistors M75 and M81 are turned on, whereby the inverted signal AN of the low level is supplied to the gates of the CMOS inverters M85 and M86, respectively, which results in that the carry output $C_o$ assumes the high level. At this time point, the MOS transistors M76, M77 and M82 are off, exerting no influence to the node N11.

As will be appreciated from the foregoing description of all the conceivable operations, the circuit according to the instant embodiment can certainly perform the logic operations of the full adder.

The CMOS inverters M67, M69, M70, M83, M84, M85 and M86 connected at the signal output portions serve not only for the inversion of the signal but also for amplification of the signal and hence stabilization of the operation. In this conjunction, it is noted that the potential at the node N10 may undergo more or less deviation from the level H or L due to noise and other causes. Even in that case, the output potential can remain at the value at least approximating the level L or H by virtue of the amplification capability of the CMOS inverters.

Figure 2:
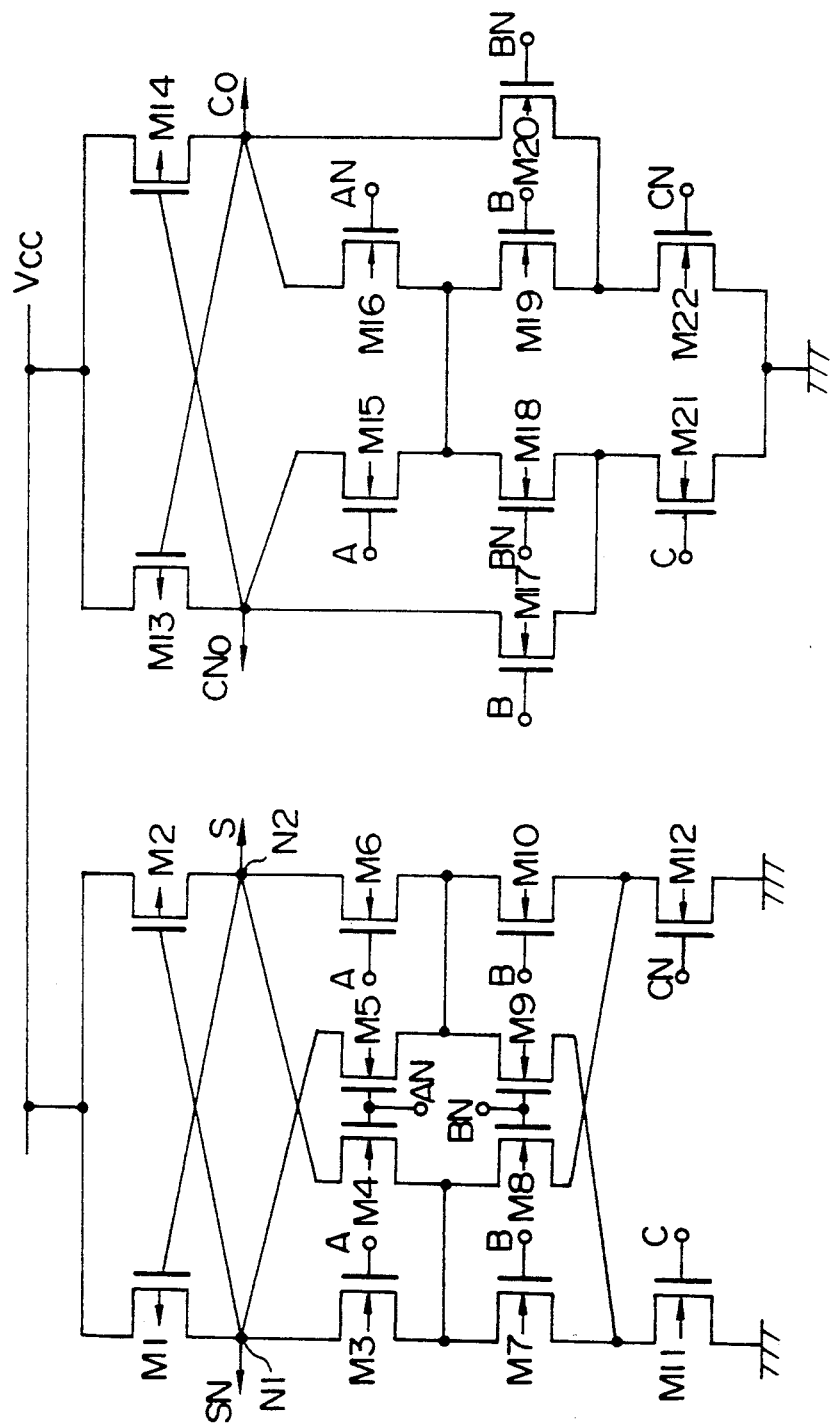
FIG. 2 is a circuit diagram showing a first example of the full adder circuit known heretofore.
Figure 3:
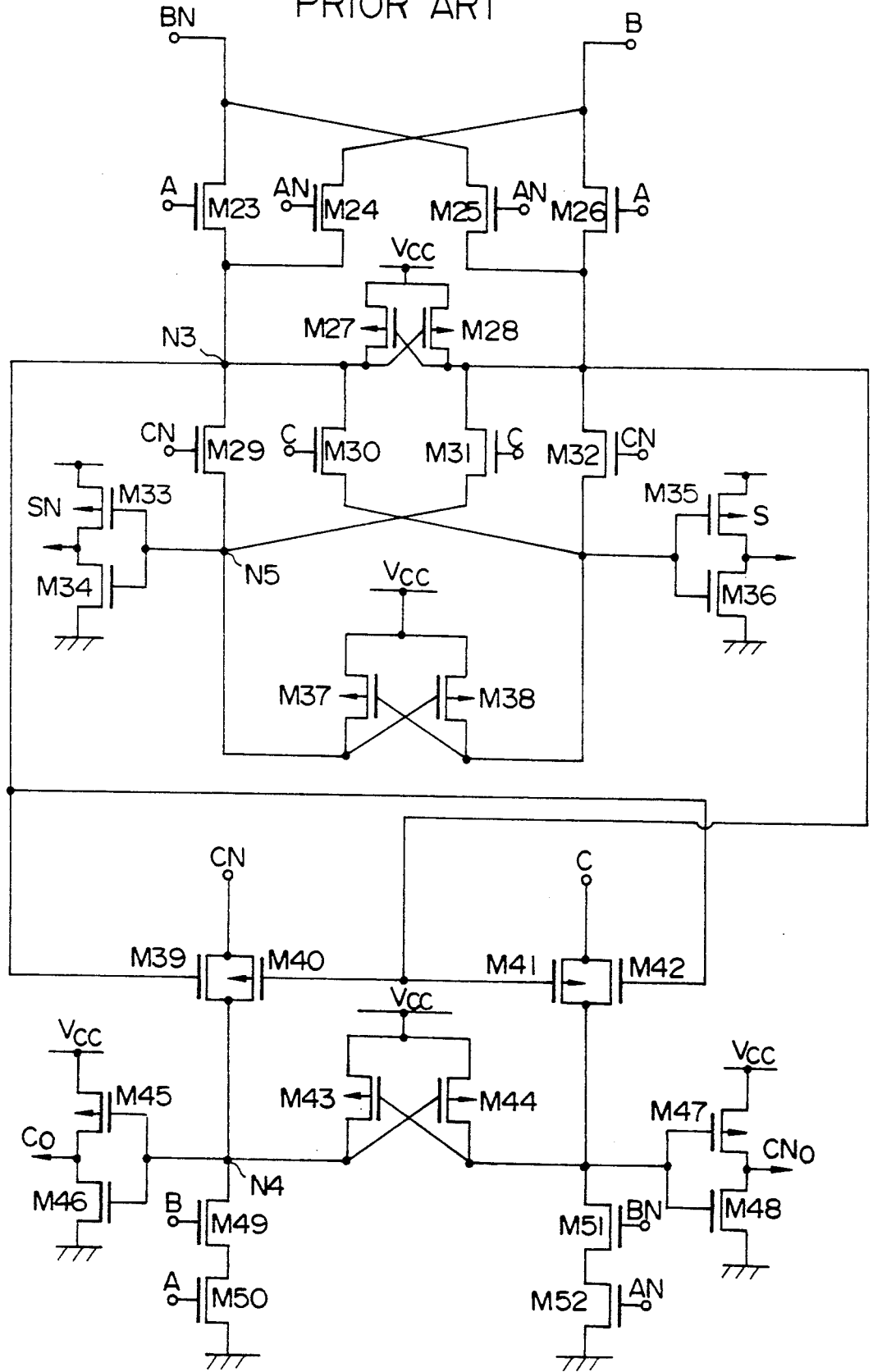
FIG. 3 is a circuit diagram showing a second example of the full adder circuit known heretofore.

The full adder circuit according to the instant embodiment of the invention is advantageously suited for high-speed operation because of absence of the latching circuit implemented by the cross-coupled p-channel MOS transistors. In other words, the difficulties mentioned hereinbefore in conjunction with the prior art circuits shown in FIGS. 2 and 3 can be evaded. Besides, in the case of the full adder circuit according to the instant embodiment, the inverted signal of the output signal can simultaneously be produced in parallel with the latter, which renders it unnecessary to employ the inverter in the succeeding logic gate circuit. This feature contributes to the speeding-up of operation as well. Further, in the case of the prior art full adder shown in FIG. 3, three stages of logic circuits are required for generating the carry signal, which provides an obstacle to the realization of high-speed operation, as described hereinbefore. In contrast, in the full adder circuit according to the instant embodiment of the invention, the number of the stages is reduced to two, whereby the operation can further be speeded up.

One of the structural features which characterizes the full adder circuit according to the instant embodiment and which the prior art circuits lack is seen in the interconnecting relationships among the MOS transistors exemplified by the transistors M71 to M82. By way of example, let's pay attention to the circuitry constituted by a pair of the MOS transistors M71 and M73. This circuitry is supplied as the inputs to the respective source electrodes with the signals A and C which are completely independent of each other, while the drain electrodes of these MOS transistors M71 and M73 are connected to each other. Certainly, in the case of the prior art circuit shown in FIG. 3, the pair of the MOS transistors M23 and M24 are interconnected in the same manner as the abovementioned pair of the MOS transistors. However, the signal inputted to the source electrode is limited to the signal B or BN each representing the inversion of the other. Consequently, limitation is inevitably imposed to the logics which can be generated or realized. In contrast, the MOS transistors M71 and M73 are supplied at the respective source electrodes with the signals A and C which are independent of each other in the case of the full adder circuit according to the instant embodiment. This feature allows much complicated logics to be realized. It should be noted that each of the pairs of the MOS transistors M72 and M74, M79 and M80, M75 and M77, M76 and M78 and the pair of M81 and M82 is connected in the same manner as the pair of the MOS transistors M71 and M73.

In the inventive full adder circuit described above, it has been assumed that MOS type field effect transistors are employed. However, it goes without saying that the junction type field effect transistors, Schottky type field effect transistors or the bipolar transistors can equally be used in the full adder circuit according to the instant embodiment of the invention. Besides, the MOS transistors M71 to M82 which are the n-channel field effect transistors may of course be replaced by the p-channel field effect transistors to the same effects. Further, the n-channel MOS transistors M71 to M82 may be either of enhancement type or depletion type. Although the use of the MOS transistors of the depletion type is accompanied with an increase in the power consumption, the current drivability of the MOS transistor can be enhanced favorably to the high-speed implementation.

Exemplary Embodiment 2

Figure 4:
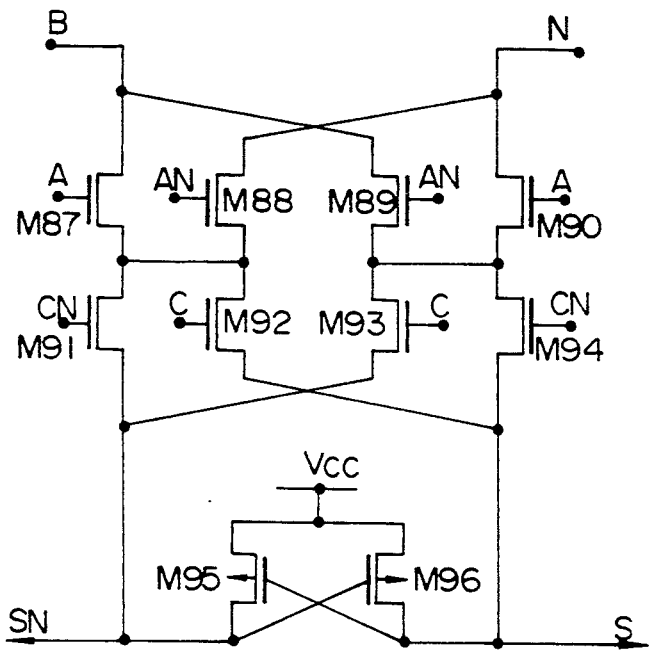
FIG. 4 is a circuit diagram showing a second exemplary embodiment of the full adder circuit according to the invention.
Figure 4:
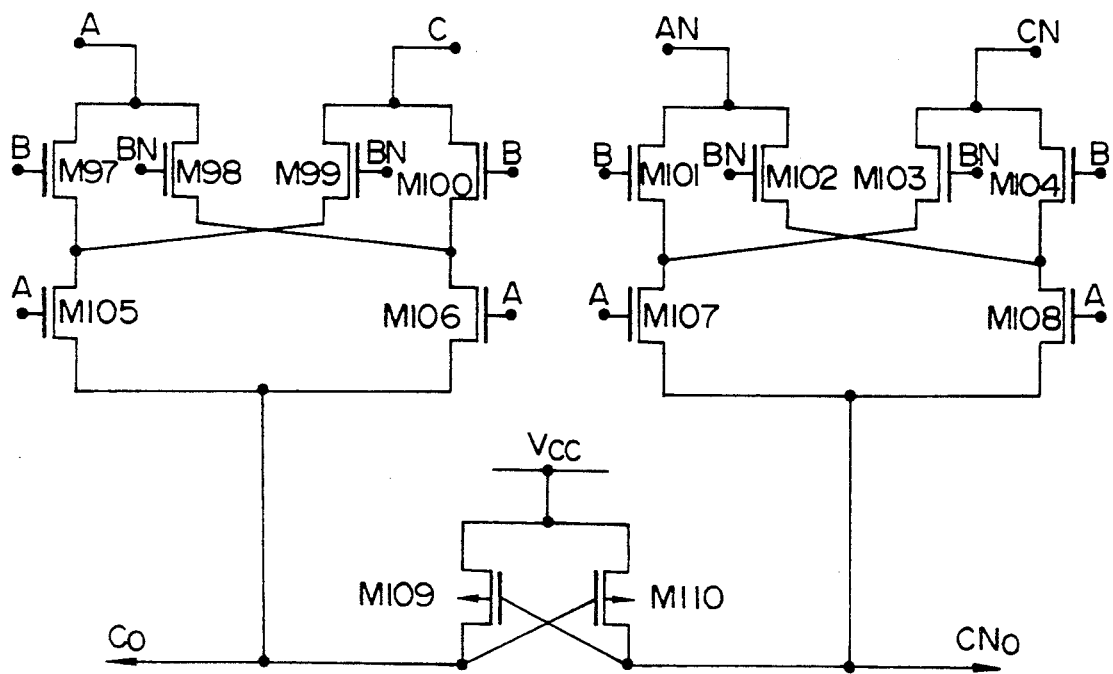

Now, a second exemplary embodiment of the present invention will be described by reference to FIG. 4. Referring to the figure, the n-channel MOS transistors M87 to M94 and M97 to M108 are interconnected in the utterly same manner as those M59 to M66 and M71 to M82. Further, the full adder circuit shown in FIG. 4 performs the utterly same basic logic operations as those of the circuit according to the first embodiment described hereinbefore. In other words, the logical values of the outputs S, SN, $C_o$ and $SN_o$ are determined by the n-channel MOS transistors M87 to M94 and M97 to M108.

A difference of the second embodiment from the first one is seen in that there are provided at the output stages or portions the latching circuits which are realized by cross-coupling the p-channel MOS transistors M95 and M96 and the p-channel MOS transistors M109 and M110, respectively. The latching circuit serves for amplifying the output voltage as in the case of the CMOS inverter employed in the full adder circuit according to the first embodiment. Certainly, the prior art full adder circuit shown in FIG. 2 includes this type of latching circuit. However, in the case of this prior art full adder, the pull-up of the output voltage is performed exclusively by the latching circuit, which provides obstacle to the realization of high-speed operation. In contrast, in the case of the full adder circuit according to the second embodiment of the invention, the latching circuit is used only supplementarily for the amplification of the output signal. Thus, the abovementioned problem of the prior art circuit can be avoided according to the invention.

The second embodiment of the invention can enjoy utterly same advantageous features as those of the first embodiment.

In the foregoing, the present invention has been described in conjunction with the full adder, which is however only by way of illustration. It must be pointed out that the sum output generating circuitry constituting a part of the full adder is also in the form of a so-called three-input Exclusive OR circuit, which may thus be used in combination with other type of circuitry. Besides, since the carry signal generating circuitry of the full adder circuit according to the invention is also a majority decision logic circuit, the former may be used in combination with other type of circuitry.

As will be now be appreciated from the foregoing description, in the logic circuit according to the present invention, the latching circuit implemented by cross-coupling of the p-channel field effect transistors is not employed or employed only supplementarily. By virtue of this feature, the current drivability can be protected against degradation due to the latching circuit. In fact, the full adder according to the present invention can operate about twice as high a speed as that of the prior art full adder. Besides, the number of the stages intervening between the input and the output is decreased when compared with the logic circuits known heretofore. This feature also contributes to the speeding-up of operation. Thus, by combining the full adder according to the present invention with a multiplier circuit, operation of the digital signal processor or the like can significantly be speeded up.

The data processing apparatus according to the present invention can be made use of as a microprocessor or digital signal processor implemented on a semiconductor chip.

What is claimed is:

1. A logic circuit, comprising:
   (1) first to sixth switching elements, each of which includes a first electrode, a second electrode and a control input electrode and in each of which electrical conduction and non-conduction between said first electrode and said second electrode are controlled in dependence on the signal levels supplied to said control input electrode; and
   (2) first to fifth nodes;
   wherein a current path between said first electrode and said second electrode of said first switching element is connected between said first node and said third node,
   wherein a current path between said first electrode and said second electrode of said second switching element is connected between said first node and said fourth node,
   wherein a current path between said first electrode and said second electrode of said third switching element is connected between said second node and said third node,
   wherein a current path between said first electrode and said second electrode of said fourth switching element is connected between said second node and said fourth node,
   wherein a current path between said first electrode and said second electrode of said fifth switching element is connected between said third node and said fifth node,
   wherein a current path between said first electrode and said second electrode of said sixth switching element is connected between said fourth node and said fifth node,
   wherein a first input signal is supplied to said first node,
   wherein a second input signal is supplied to said control input electrode of said first switching element and to said control input electrode of said fourth switching element,
   wherein a signal having a phase opposite to that of said second input signal is supplied to said control input electrode of said second switching element and to said control input electrode of said third switching element,
   wherein a third input signal is supplied to said second node,
   wherein one signal selected from said first, second and third input signals is supplied to said control input electrode of said fifth switching element,
   wherein a signal having a phase opposite to that of said signal supplied to said control input electrode of said fifth switching element is supplied to said control input electrode of said sixth switching element; and
   wherein a signal related to said first, second and third input signals is generated from said fifth node.

2. A logic circuit according to claim 1, wherein said first to sixth switching elements are constituted by field effect transistors, respectively.

3. A data processing apparatus including a full adder, wherein said full adder includes a carry signal generating circuitry constituted by the logic circuit as set forth in claim 1.

4. A data processing apparatus according to claim 3, wherein said first to sixth switching elements are constituted by field effect transistors, respectively.

5. A logic circuit, comprising:
(1) first to sixth switching elements, each of which includes a first electrode, a second electrode and a control input electrode and in each of which electrical conduction and non-conduction between said first electrode and said second electrode are controlled in dependence on the signal levels supplied to said control input electrode; and
(2) first to fifth nodes;
wherein a current path between said first electrode and said second electrode of said first switching element is connected between said first node and said third node.
wherein a current path between said first electrode and said second electrode of said second switching element is connected between said first node and said fourth node.
wherein a current path between said first electrode and said second electrode of said third switching element is connected between said second node and said third node,
wherein a current path between said first electrode and said second electrode of said fourth switching element is connected between said second node and said fourth node,
wherein a current path between said first electrode and said second electrode of said fifth switching element is connected between said third node and said fifth node,
wherein a current path between said first electrode and said second electrode of said sixth switching element is connected between said fourth node and said fifth node.
wherein a first input signal is supplied to said first node,
wherein a second input signal is supplied to said control input electrode of said first switching element and to said control input electrode of said fourth switching element,
wherein a signal having a phase opposite to that of said second input signal is supplied to said control input electrode of said second switching element and to said control input electrode of said third switching element,
wherein a third input signal is supplied to said second node,
wherein one signal selected from said first, second and third input signals is supplied to said control input electrode of said fifth switching element,
wherein a signal having a phase opposite to that of said signal supplied to said control input electrode of said fifth switching element is supplied to said control input electrode of said sixth switching element,
wherein a signal related to said first, second and third input signals is generated from said fifth node, and
wherein said generated signal is a carry output signal related to said first, second and third input signals.

6. A logic circuit according to claim 5,
wherein said first to sixth switching elements are constituted by field effect transistors, respectively.

7. A logic circuit, comprising:
(1) first to sixth switching elements, each of which includes a first electrode, a second electrode and a control input electrode and in each of which electrical conduction and non-conduction between said first electrode and said second electrode are controlled in dependence on the signal levels supplied to said control input electrode; and
(2) first to fifth nodes;
wherein a current path between said first electrode and said second electrode of said first switching element is connected between said first node and said third node,
wherein a current path between said first electrode and said second electrode of said second switching element is connected between said first node and said fourth node,
wherein a current path between said first electrode and said second electrode of said third switching element is connected between said second node and said third node,
wherein a current path between said first electrode and said second electrode of said fourth switching element is connected between said second node and said fourth node,
wherein a current path between said first electrode and said second electrode of said fifth switching element is connected between said third node and said fifth node,
wherein a current path between said first electrode and said second electrode of said sixth switching element is connected between said fourth node and said fifth node,
wherein a first input signal is supplied to said first node,
wherein a second input signal is supplied to said control input electrode of said first switching element and to said control input electrode of said fourth switching element,
wherein a signal having a phase opposite to that of said second input signal is supplied to said control input electrode of said second switching element and to said control input electrode of said third switching element,
wherein a third input signal is supplied to said second node,
wherein one signal selected from said first, second and third input signals is supplied to said control input electrode of said fifth switching element,
wherein a signal having a phase opposite to that of said signal supplied to said control input electrode of said fifth switching element is supplied to said control input electrode of said sixth switching element,
wherein a signal related to said first, second and third input signals is generated from said fifth node, and
wherein said generated signal is a majority decision output signal related to said first, second and third input signals.

8. A logic circuit according to claim 7,
wherein said first to sixth switching elements are constituted by field effect transistors, respectively.

* * * * *